United States Patent Office 2,849,774
Patented Sept. 2, 1958

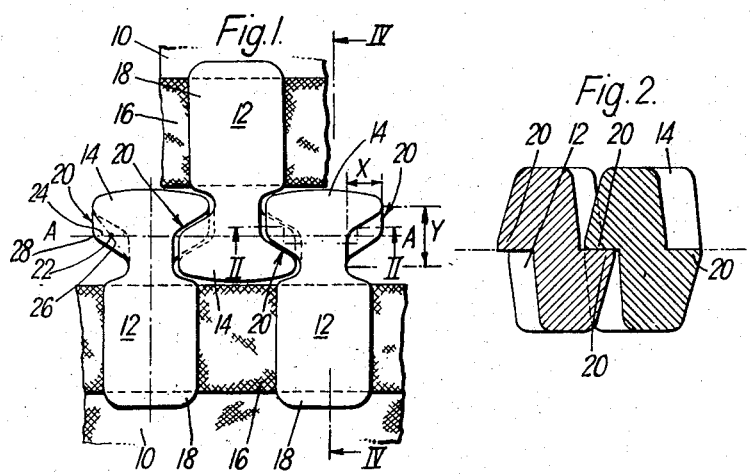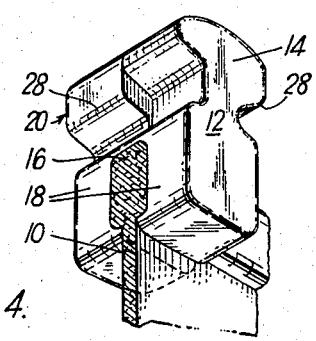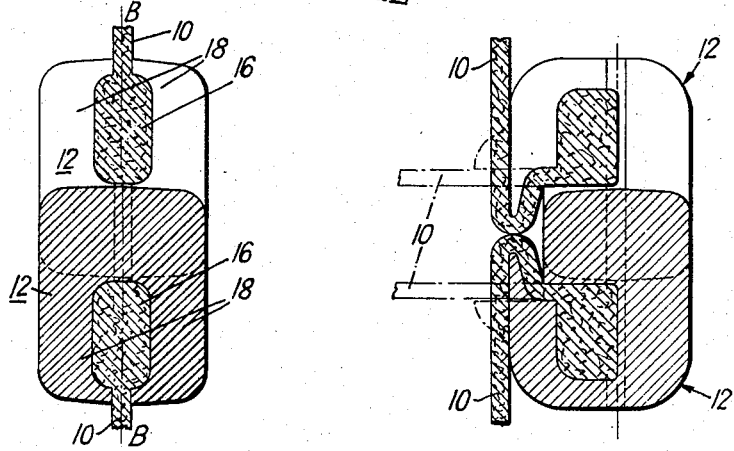

2,849,774

SLIDING CLASP FASTENERS

Ernst Ryser, Tessin, Switzerland, assignor of one-half to Bertrand Voumard, La Chaux-de-Fonds, Switzerland Application May 17, 1955, Serial No. 509,039

Claims priority, application Switzerland May 17, 1954

8 Claims. (Cl. 24—205.13)

This invention relates to sliding clasp fasteners.

The common method of manufacturing such fasteners is first of all to manufacture the fastener elements, generally by a stamping process, and then to fix the elements to the tapes or stringers. This two-stage manufacturing process has obvious disadvantages which have led to proposals to cast the elements directly on to the stringers. Such proposals, however, have not had any commercial success because it has not so far been found possible to design elements which ensure security of engagement when in use, an appropriate degree of flexibility of the fastener and smoothness of operation when opening and closing the fastener by means of the slider and which can be cast in a two-piece mould.

The invention is concerned with a design of fastener element having or leading to the desirable features indicated above.

In the fastener in accordance with the invention, the elements are T-headed and, in the closed position of the fastener, the crosspieces of the elements on one stringer are inter-engaged with the crosspieces of the elements on the other stringer. Extending from the crosspiece of each element towards its associated stringer are overlapping portions of half the thickness of the crosspiece which extend in depth in opposite directions from the central plane of the element to one or the other of the faces of the crosspiece so that the overlapping portions of an element on one stringer overlie the overlapping portions on the neighbouring elements on the other stringer. The faces of the engaging portions which lie in the central plane of the elements are substantially rhombodial with the shorter diagonal of the rhomboid lying in the central longitudinal axis of the fastener and the longer diagonal proceeding inwards away from the outer end of the crosspiece.

An example of a fastener in accordance with the invention is shown in the accompanying drawings in which:

Figure 1 is a plan view of a fragment of the fastener in the closed condition;

Figure 2 is a section taken on the line II—II in Figure 1;

Figure 3 is a perspective view to a larger scale of one of the fastener elements;

Figure 4 is a section taken on the line IV—IV on Figure 1; and

Figure 5 is a section which corresponds to Figure 4 of an "invisible" fastener in accordance with the invention.

Fig. 1 shows two tapes or stringers 10 to which are fixed fastener elements 12. The elements are T-headed, as shown, the crosspieces 14 of the elements on the two stringers being inter-engaged in the closed condition of the fastener. The fastener is intended to be operated by means of a slider in the conventional manner.

The stringers 10 have beaded edges 16. As will be further explained, the elements 12 are cast directly on to the stringers so that the beads 16 are gripped by the bifurcated legs 18 or shanks of the elements.

In order that the fastener elements 12 may be maintained against relative movement in a direction parallel to the plane of symmetry A—A (Fig. 1) of the fastener, the crosspieces 14 have extending from them towards the associated stringers overlapping portions 20 which are of half the thickness of the main body of the crosspieces, or crosspiece proper. The overlapping portions 20 extend in depth in opposite directions from the central plane B—B (Fig. 4) of the elements, the contacting faces of those portions lying in that plane.

These overlapping portions are of substantially rhomboidal shape, the diagonals of the rhomboid intersecting at points 22 in the plane of symmetry A—A of the fastener. The shorter diagonal 24 lies in that plane while the longer diagonal 26 proceeds inwards away from the outer end of the crosspiece.

The conditions set forth in the preceding paragraph ensure that the fastener will remain closed in spite of a considerable degree of flexing of the fastener longitudinally and transversely.

The security of the fastening is enhanced by the fact that the crosspieces of the T-headed elements are fully engaged; in other words, each crosspiece 14 occupies substantially the whole of the space defined by the crosspieces of a pair of neighbouring elements on the other stringer; also, the rhomboidal portions 20 of the elements are completely overlapped. The rhomboidal shape of those portions ensures that the length X of the overlapping surfaces in the longitudinal direction of the fastener is relatively short and the length Y of the overlapping surfaces on the transverse direction is relatively long. These are conditions which are conducive to security against opening of the fastener except by the conventional use of the slider.

It is very desirable that a fastener of this kind be smooth running, i. e. that under the influence of the slider, the elements will engage and disengage easily. As one side of the rhomboidal face 20 proceeds away from the outer end of the crosspiece towards the central longitudinal axis A, the underside of the crosspiece proper is inclined. There is a best angle of inclination which varies with the other dimensions of the fastener element. In order to enhance the smooth running qualities it is advisable to radius the outer edge of each of the overlapping portions as shown at 28.

The legs or shanks 18 of the elements are preferably of substantial width to ensure security of maintenance of closure of the fastener. This width, however, should not be too great as it will then reduce the longitudinal flexibility of the fastener. A good compromise is to make the shanks of about the same width as or of a slightly smaller width than that of the crosspieces as shown in Fig. 1. This also has certain manufacturing advantages.

It will be seen that the fastening element described above is eminently suitable for being cast in a two-piece mould. It therefore becomes a practical proposition to manufacture the fastener by casting the elements directly on to the stringers while producing a fastener which is smooth running and will remain securely closed. The elements are symmetrical about their longitudinal axis both in front elevation and side elevation. That also is advantageous in that it leads to simplicity of manufacture of the mould.

The elements can be cast directly on to the stringer so that the bead 16 is securely embraced by the shank 18 of each element as shown in Fig. 4. This can be done in one operation whereas the pre-manufacture and subsequent mounting of the elements involves two separate operations.

The elements need not be mounted on stringers in the form of tapes. They can, for example, be mounted directly on to the edge of a garment. The references herein to stringers are to be construed accordingly.

The elements can be made of metal and, in particular of a light material such as zinc or a zinc base alloy such as those sold under the trade names Mazac and Zamac. Alternatively, they can be made of a plastic such for example, as nylon, polystyrene, polyamine and so on.

The stringers can be of fabric or of a plastic.

Fig. 5 shows an example of a so-called "invisible" fastener in which, in the closed position, the stringers cover the front of the fastener elements so as to make them invisible. A method of forming such an "invisible" fastener is described in detail in patent application No. 492,607 filed March 7, 1955. Broadly, that method consists in making the elements of a shape which enables them after being mounted on the stringers, to be deformed so that the beads of the stringers lie in planes parallel to the tape portions.

In making an invisible fastener in accordance with the invention, the elements 12 are first cast to the shape indicated in chain lines and are then deformed into the position shown in full lines. Although this deformation represents an extra manufacturing operation, it is one which can be carried on the same machine, the casting and the deformation being effected in sequence, and does not involve any second handling of the fastener.

I claim:

1. A sliding clasp fastener having T-headed fastener elements, the crosspieces of which are inter-engaged in the closed position of the fastener and have extending from them towards their associated stringers overlapping portions of half the thickness of the main body of the crosspieces and extending in depth in opposite directions from the central plane of the elements to one and the other of the faces of the crosspieces, the faces of the overlapping portions which lie in the central plane of the elements being substantially rhomboidal with the shorter diagonal of the rhomboid in the central longitudinal axis of the fastener and the longer diagonal proceeding inwards away from the outer end of the crosspiece.

2. A sliding clasp fastener according to claim 1 in which the elements are symmetrical about their longitudinal axis both in front elevation and side elevation.

3. A sliding clasp fastener according to claim 1 in which the crosspiece of an element on one stringer occupies substantially the whole of the space defined by the other stringer and the crosspieces of a pair of neighbouring elements thereon.

4. A sliding clasp fastener according to claim 1 in which the rhomboidal faces on each element are completely overlapped by the rhomboidal faces on neighbouring elements on the other stringer.

5. A sliding clasp fastener according to claim 1 in which the outer edge of each of the overlapping portions is rounded.

6. A sliding clasp fastener according to claim 1 in which over the length of the fastener elements respectively which they grip a stringer the legs of the fastener elements are of substantially the same width as the crosspieces.

7. A sliding clasp fastener according to claim 1 in which the fastener elements are cast directly on to the stringers.

8. A sliding clasp fastener according to claim 1 in which the fastener elements are made of a plastic.

References Cited in the file of this patent

UNITED STATES PATENTS

| 2,221,441 | Quisling | Nov. 12, 1940 |

FOREIGN PATENTS

| 124,703 | Australia | July 10, 1947 |
| 281,732 | Switzerland | July 1, 1952 |
| 680,797 | Great Britain | Oct. 15, 1952 |
| 1,053,092 | France | Jan. 29, 1954 |